United States Patent [19]
Müller

[11] Patent Number: 5,058,645
[45] Date of Patent: Oct. 22, 1991

[54] STUD LINK FOR TIRE CHAINS HAVING A PROFILED ELEMENT PROJECTING FROM A WEAR SURFACE

[75] Inventor: Anton Müller, Aalen, Fed. Rep. of Germany

[73] Assignee: Eisen- und Drahtwerk Aktiengesellschaft, Aalen, Fed. Rep. of Germany

[21] Appl. No.: 494,178

[22] Filed: Mar. 14, 1990

[30] Foreign Application Priority Data

Mar. 31, 1989 [DE] Fed. Rep. of Germany ....... 3910390

[51] Int. Cl.$^5$ .................. B60C 27/20; B60C 27/08
[52] U.S. Cl. .................................... 152/244; 152/243; 59/78; 59/93
[58] Field of Search ............... 152/171, 172, 222, 223, 152/225, 225 C, 233, 241, 242, 243, 244, 245; 59/78, 85, 87, 88, 90, 91, 92, 93

[56] References Cited

U.S. PATENT DOCUMENTS

| | | | |
|---|---|---|---|
| 968,415 | 8/1910 | Reagan | 152/244 |
| 2,020,082 | 11/1935 | Seeley | 152/244 |
| 3,592,251 | 7/1971 | Muller | 152/243 |
| 3,709,275 | 1/1973 | Muller | 152/243 |
| 3,796,246 | 3/1974 | Walenta | 152/243 |
| 3,892,268 | 7/1975 | Asbeck | 152/243 |
| 4,129,285 | 12/1978 | Graham | 59/84 |
| 4,349,060 | 9/1982 | Espedalen | 152/243 |

FOREIGN PATENT DOCUMENTS 2126622 12/1972 Fed. Rep. of Germany ...... 152/243

Primary Examiner—Michael W. Ball
Assistant Examiner—Gregory J. Wilber
Attorney, Agent, or Firm—Robert W. Becker & Associates

[57] ABSTRACT

A stud link for a tire chain is provided. The stud link includes a link body that has at least one attachment opening for further links of the chain. Longitudinal surfaces of the link body form a tire contact surface, and also form a wear surface beyond which at least one profiled element projects. At least a portion of the profiled element extends at an angle to a longitudinal central plane of the stud link.

16 Claims, 2 Drawing Sheets

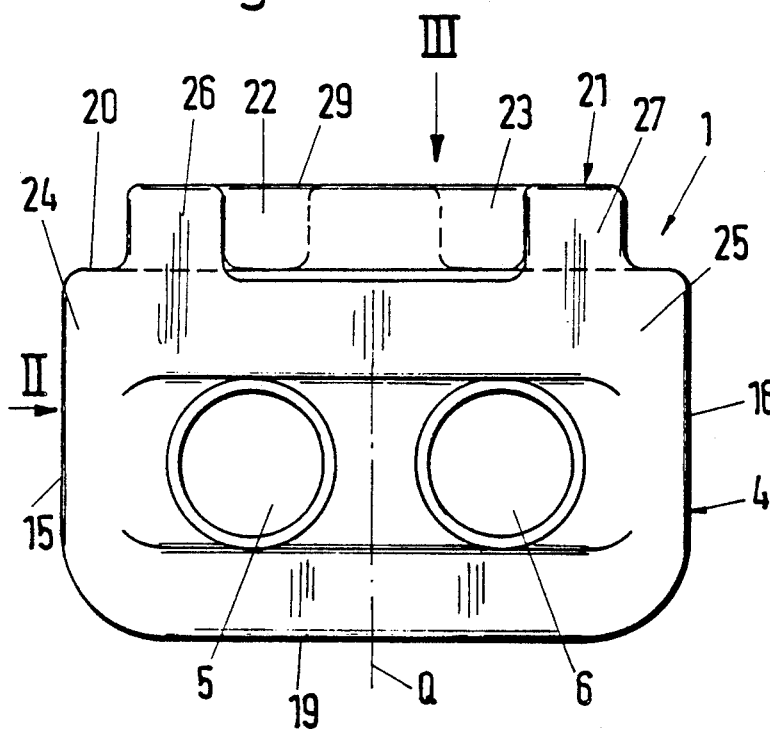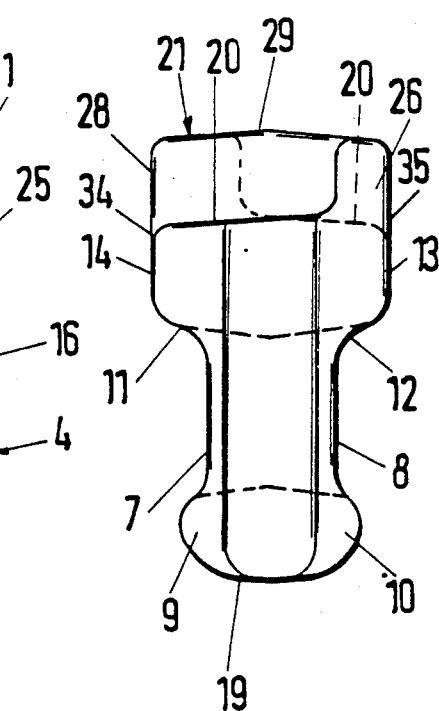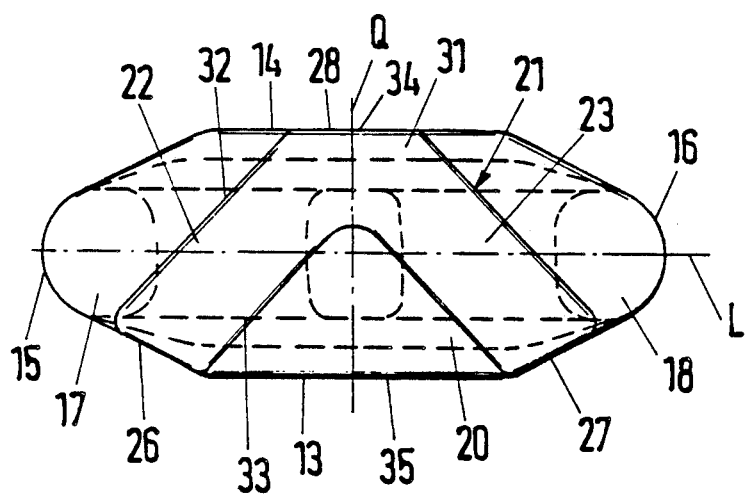

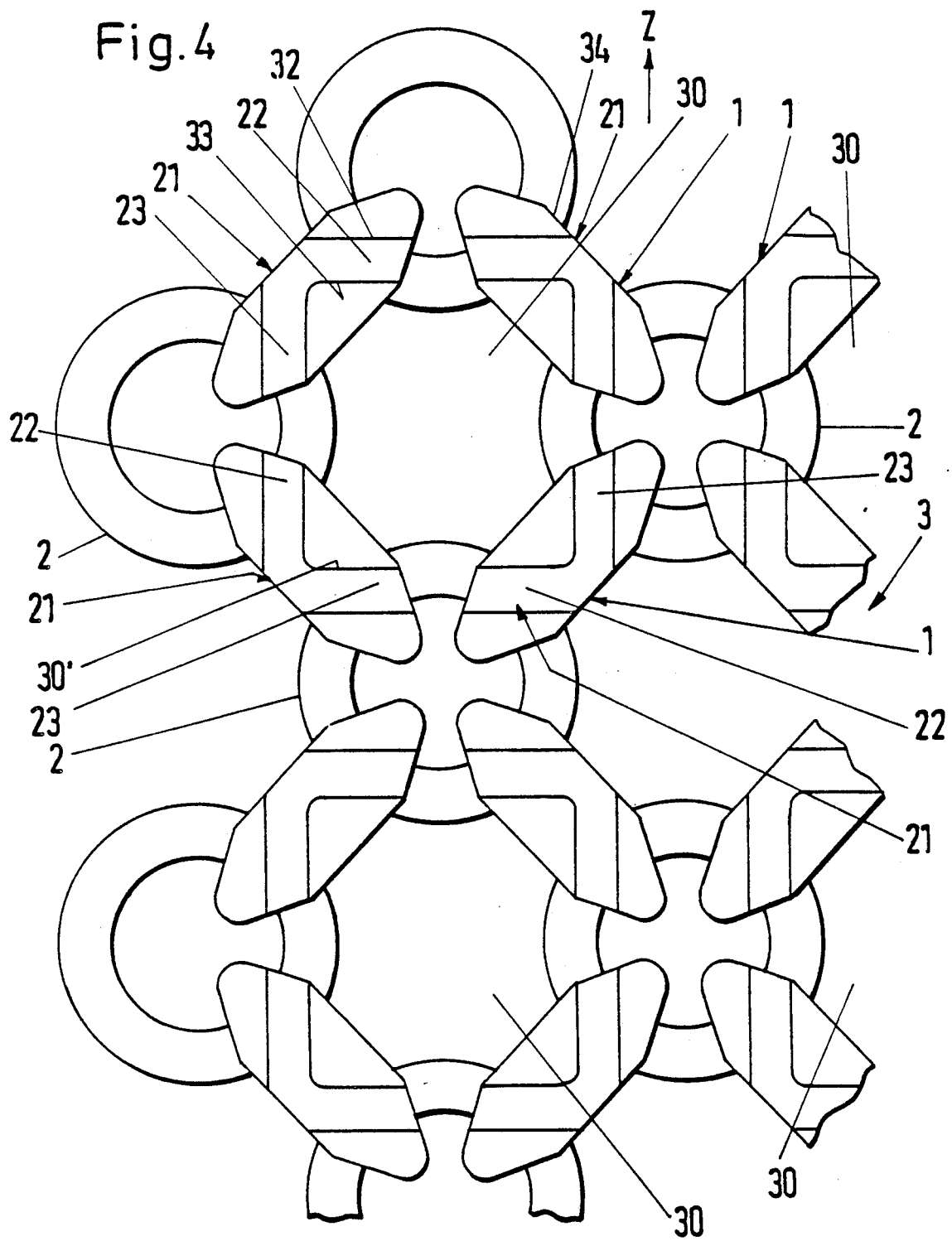

STUD LINK FOR TIRE CHAINS HAVING A PROFILED ELEMENT PROJECTING FROM A WEAR SURFACE

BACKGROUND OF THE INVENTION

The present invention relates to a stud link for a tire chain, especially an antiskid chain, including a link body that has at least one suspension or attachment opening for further links of the chain, with longitudinal surfaces of the link body forming a tire contact surface, and also forming a wear surface beyond which at least one profiled element projects Known stud links of this general type have a plate-like link body that is provided with successive, spaced-apart studs or domes that are disposed on the wear side of the stud link and form the profiled element. These studs or domes increase the traction and steering behavior of the stud link. Recesses are formed between the studs in which particles such as dirt and stones can easily accumulate and become stuck during use of the stud link. This adversely affects the traction of the stud link Where rough conditions of use are encountered, the danger exists that the studs will break off, thus further reducing the traction.

It is an object of the present invention to provide a stud link of the aforementioned general type that not only ensures a good automatic or self cleaning, but also ensures a high traction, even under extreme conditions of use.

BRIEF DESCRIPTION OF THE DRAWINGS

This object, and other objects and advantages of the present invention, will appear more clearly from the following specification in conjunction with the accompanying schematic drawings, in which:

FIG. 1 is a side view of one exemplary embodiment of the inventive stud link;

FIG. 2 is an end view taken in the direction of the arrow II in FIG. 1;

FIG. 3 is a plan view taken in the direction of the arrow III in FIG. 1; and

FIG. 4 shows a portion of a tire protection chain composed of ring links and of stud links of the type illustrated in FIGS. 1 to 3.

SUMMARY OF THE INVENTION

The stud link of the present invention is characterized primarily in that at least a portion of the profiled element extends at an angle to a longitudinal central plane of the stud link. Due to the fact that it projects and extends at an angle to the longitudinal central plane of the stud link, the inventive profiled element provides a good traction for the stud link. Since it extend at an angle to the longitudinal central plane of the stud link, the inventive profiled element can be embodied as a continuous projection in which, therefore, no particles such as rocks and dirt can accumulate. The traction is therefore ensured at all times, even under unfavorable conditions of use. A tire chain equipped with such stud links has a good steering behavior as a consequence of the inventive profiled elements.

Further specific features of the presen invention will be described in detail subsequently.

DESCRIPTION OF PREFERRED EMBODIMENTS

Referring now to the drawings in detail, the stud link 1 of FIGS. 1 to 3 serves as a traction link that, as shown in FIG. 4, is connected to ring links 2 to form the link structure of a tire protection or antiskid chain 3.

The stud link 1 comprises a plate-shaped link body 4 that is provided with at least one, and preferably two, suspension or attachment openings 5 and 6 for chain links 2 of the tire chain 3 that are to be attached. As can be clearly seen from FIG. 2, the link body 4 is thicker both above and below the attachment openings 5 and 6. Provided below the attachment openings 5, 6 are bulges 9, 10 that project beyond the two side surfaces 7, 8. The link body 4 is thicker in the region above the attachment openings 5, 6 than in the region of the bulges 9, 10. The side surfaces 7, 8 continuously merge in a curved manner via shoulders 11, 12 into side surface portions 13, 14 that extend approximately parallel to the side surfaces 7, 8. As shown in FIG. 3, the link body 4 tapers towards its end surfaces 15, 16, which are rounded off in the shape of a partial circle. As can be seen from the plan view of FIG. 3, the link body 4 has an approximately diamond shape whereas its tapered end portions 17, 18, which each extend over only approximately a fourth of the length of the link body, have a trapezoidal shape with rounded-off narrow bases.

When the tire chain 3 is mounted on the tire, the longitudinal surface or edge 19 of the link body 4, which longitudinal edge merges into the bulges 9, 10, rests upon the tire, while the other, roofshaped longitudinal surface faces the roadway and forms a wear surface 20.

A profiled element 21 projects beyond the wear surface 20; this profiled element 21 is continuous and integral with the link body 4.

As shown in FIG. 3, the profiled element 21 is preferably a V-shaped raised portion or rib that is symmetrical relative to the transverse central plane Q of the link body 4.

The profiled element 21 has an approximately square cross-sectional shape. As seen in the plan view of the stud link in FIG. 3, the legs 22, 23 of the profiled element 21 extend from the center of the side surface portion 14 of the link body at an angle outwardly in opposite directions to the opposite side surface portion 13 or the pertaining portions 24, 25 of the tapered link body portions 17, 18.

The legs 22, 23 of the profiled element 21 form an angle of approximately 90° with one another. The end faces 26, 27 of the legs 22, 23 are flush with the side surface portion 13 and extend about halfway along the end portions 17, 18. The profiled element 21 has a truncated tip 31 with a planar outer surface 28 that extends at right angles to the transverse central plane Q of the link body 4. The outer surface 28 is disposed in the same plane as the side surface portion 14 of the link body.

The profiled element 21 has approximately the same thickness as does the link body 4 in the region between the attachment openings 5, 6 and the end surfaces 15, 16.

The legs 22, 23 of the profiled element 21 each extend at an angle of approximately 45° relative to the longitudinal central plane L of the link body 4. The height of the profiled element 21 is approximately equal to the height of the link body portions above and below the attachment openings 5, 6. The upper surface 29 of the profiled element 21 is planar and smooth, so that no particles such as stones and dirt can accumulate there. As shown in FIG. 2, the upper surface 29 of the profiled element 21 has a rooflike shape in a direction transverse to the longitudinal direction of the stud link.

As can be seen in the tire chain 3 illustrated in FIG. 4, the ring links 2 and the stud links 1 form square chain meshes 30. The stud links 1 of the chain meshes 30 are arranged in such a way that the legs 22, 23 of the profiled elements 21 thereof are disposed in and transverse to the longitudinal direction Z of the chain, whereas the stud links themselves are disposed at an angle to the longitudinal direction Z. In the illustrated embodiment, the stud links 1 are disposed at an angle of approximately 45° relative to the longitudinal direction Z of the chain, so that the legs 22, 23 of the profiled elements 21 of the stud links extend at right angles to and parallel to the longitudinal direction Z. The stud links 1 delimit a chain mesh 30, the legs 22, 23 in turn define a square 30', the diagonals of which are disposed at 45° to the diagonals of the square chain meshes 30. Thus, each square chain mesh 30 has superimposed thereover that traction rhombus 30', which is offset by 45° relative thereto, that is formed by the profiled elements 21 of the stud links 1 of the respective chain mesh 30. Since, as shown in FIGS. 3 and 4, each of the profiled elements 21 has two V-shaped traction edges 32, 33, and the stud links 1 are similarly provided with traction edges 34, 35 at the transition from the side surface portions 13, 14 to the longitudinal edge or surface 20, the chain 3 has twice as many traction edges as does a chain where the stud links have no profiled elements that are disposed at an angle to their longitudinal direction. This high number of traction edges 32 to 35 makes itself particularly noticeable in an advantageous manner during use in soft ground.

The chain can also have other configurations. For example, the chain meshes can have a honeycombed shape. In such a case, the chain meshes are hexagonal. The traction edges 32, 33 of the profiled elements 21, and the traction edges 34, 35 of the stud links, similarly result in a large number of traction edges that are particularly advantageous in soft ground.

The profiled elements 21 of the stud links have the advantage that as a consequence of their continuous construction as an angular element, they have as great a traction rigidity and stability as possible since under extreme stress no individual parts of the profiled elements can break off. The large-surface and smooth construction of the profiled elements ensures a high self or automatic cleaning of the chain. A particularly high traction and steering behavior is achieved in a straightforward manner as a consequence of the traction edges of the profiled elements. As a result, a tire chain having the inventive stud links illustrated in FIGS. 1 to 3 is particularly suitable for soft ground, in which the inventive stud links ensure a good transfer of force and a high steering behavior. Due to the V-shaped configuration of the profiled elements 21, a large surface is available for the hardening of the profiled elements, so that in conformity with the application of the chain 3, the profiled elements 21 can be optimally hardened.

To further increase the traction and hardening zones, the profiled elements 21 of the stud links 1 can be provided with additional studs or domes and/or lateral recesses, as such are known with conventional stud links. As a result an appropriate chain can be provided for particular conditions of use. The stud links 1 can be disposed in the chain construction in such a way that the legs 22, 23 of the profiled elements 21 are not directed in a direction toward the chain mesh that is defined by the stud links, but rather are directed outwardly. The stud links 1 can also be disposed in such a way that the legs 22, 23 of some of the stud links are directed outwardly, while the legs 22, 23 of the other stud links are directed inwardly. In this way, the traction conditions and the steering behavior of the chain can be individually adapted to the respectively desired application. In the illustrated embodiment, the stud links are each provided with only a single V-shaped profiled element 21. However, it is also possible for the stud link to be provided with at least one further V-shaped profiled element. In addition, it is also possible to have a further leg that is disposed at an angle to the legs 22 or 23. This further leg could extend parallel to the other leg 23 or 22, or could also extend at an angle thereto.

The present invention is, of course, in no way restricted to the specific disclosure of the specification and drawings, but also encompasses any modifications within the scope of the appended claims.

What I claim is:

1. A stud link for a tire chain, comprising:
   a plate-shaped link body that has at least one attachment opening for further links of said chain, with a longitudinal central plane of said link body, when said stud link is part of said chain on a tire surface, extending essentially perpendicular to said tire surface, with said link body having a tire contact surface that extends essentially perpendicular to said longitudinal central plane of said link body, and also having a wear surface on a side of said link body opposite said tire contact surface thereof; and
   at least one continuous profiled element that is integrally disposed on said wear surface of said link body and projects beyond said wear surface away from said tire, whereby at least a portion of said profiled element extends at an angle to said longitudinal central plane of said link body, with said continuous profiled element extending over nearly the entire length of said wear surface and comprising at least two legs, which extend at an angle to one another and also at an angle to said longitudinal central plane of said link body.

2. A stud link according to claim 1, in which said profiled element extends over nearly the entire width of said wear surface.

3. A stud link according to claim 1, in which said legs extend at an angle of approximately 45° to said longitudinal central plane of said link body.

4. A stud link according to claim 1, in which said profiled element has a mirror-symmetrical configuration relative to a transverse central plane of said link body.

5. A stud link according to claim 1, in which said profiled element has a V-shaped configuration.

6. A stud link according to claim 1, in which said legs of said profiled element have end faces that are coplanar with side surface portions of said link body.

7. A stud link according to claim 6, in which said legs of said profiled element extend over the entire width of said link body and nearly to end surfaces thereof.

8. A stud link according to claim 7, in which said end surfaces of said link body are tapered and rounded-off.

9. A stud link according to claim 7, in which said end faces of said legs of said profiled element extend outwardly at an angle in a direction toward said longitudinal central plane of said link body.

10. A stud link according to claim 7, in which the thickness of said profiled element corresponds approximately to the thickness of said link body in the vicinity of said end surface thereof.

11. A stud link according to claim 10, in which the thickness of said link body is greater on either side of said at least one attachment opening, in a direction toward said tire contact surface and said wear surface, than in the area of said at least one attachment opening itself.

12. A stud link according to claim 6, in which said legs of said profiled element have outer surfaces that converge toward one another and between which is disposed an outer surface portion that extends at an obtuse angle to said outer surfaces and is flush with a side surface portion of said link body that is remote from said end faces of said legs of said profiled element.

13. A stud link according to claim 1, in which said legs of said profiled element extend approximately perpendicular to one another.

14. A stud link according to claim 1, in which said profiled element has an essentially square cross-sectional shape.

15. A stud link according to claim 1, in which said profiled element is provided with projections that extend outwardly beyond a ground contact surface thereof.

16. A stud link according to claim 1, in which said profiled element has a ground contact surface that is provided with recess means.

* * * * *

UNITED STATES PATENT AND TRADEMARK OFFICE
CERTIFICATE OF CORRECTION

PATENT NO. : 5,058,645
DATED : Oct. 22, 1991
INVENTOR(S) : Anton Müller

It is certified that error appears in the above-identified patent and that said Letters Patent is hereby corrected as shown below:

On the title page, please correct the following:

[73] Assignee: Eisen- und Drahtwerk Erlau Aktiengesellschaft, Aalen, Federal Republic of Germany Signed and Sealed this Twenty-third Day of November, 1993

*Attest:*

BRUCE LEHMAN

*Attesting Officer*      *Commissioner of Patents and Trademarks*